TELEPHONE INTERCEPT CIRCUIT

Filed April 14, 1951 4 Sheets-Sheet 1

INVENTOR.
THEODOR FRANKEL
BY T. L. Bowes
ATTORNEY

INVENTOR.
THEODOR FRANKEL
BY T. L. Bowes
ATTORNEY

Oct. 5, 1954 T. FRANKEL 2,691,069

TELEPHONE INTERCEPT CIRCUIT

Filed April 14, 1951 4 Sheets-Sheet 3

INVENTOR.
THEODOR FRANKEL
BY T. L. Bowes
ATTORNEY

Oct. 5, 1954 T. FRANKEL 2,691,069

TELEPHONE INTERCEPT CIRCUIT

Filed April 14, 1951 4 Sheets-Sheet 4

INVENTOR.
THEODOR FRANKEL

BY T. L. Bowes

ATTORNEY

Patented Oct. 5, 1954 2,691,069

UNITED STATES PATENT OFFICE 2,691,069

TELEPHONE INTERCEPT CIRCUIT

Theodor Frankel, Rochester, N. Y., assignor to Stromberg-Carlson Company, a corporation of New York Application April 14, 1951, Serial No. 221,072

4 Claims. (Cl. 179—27)

Figure 1:
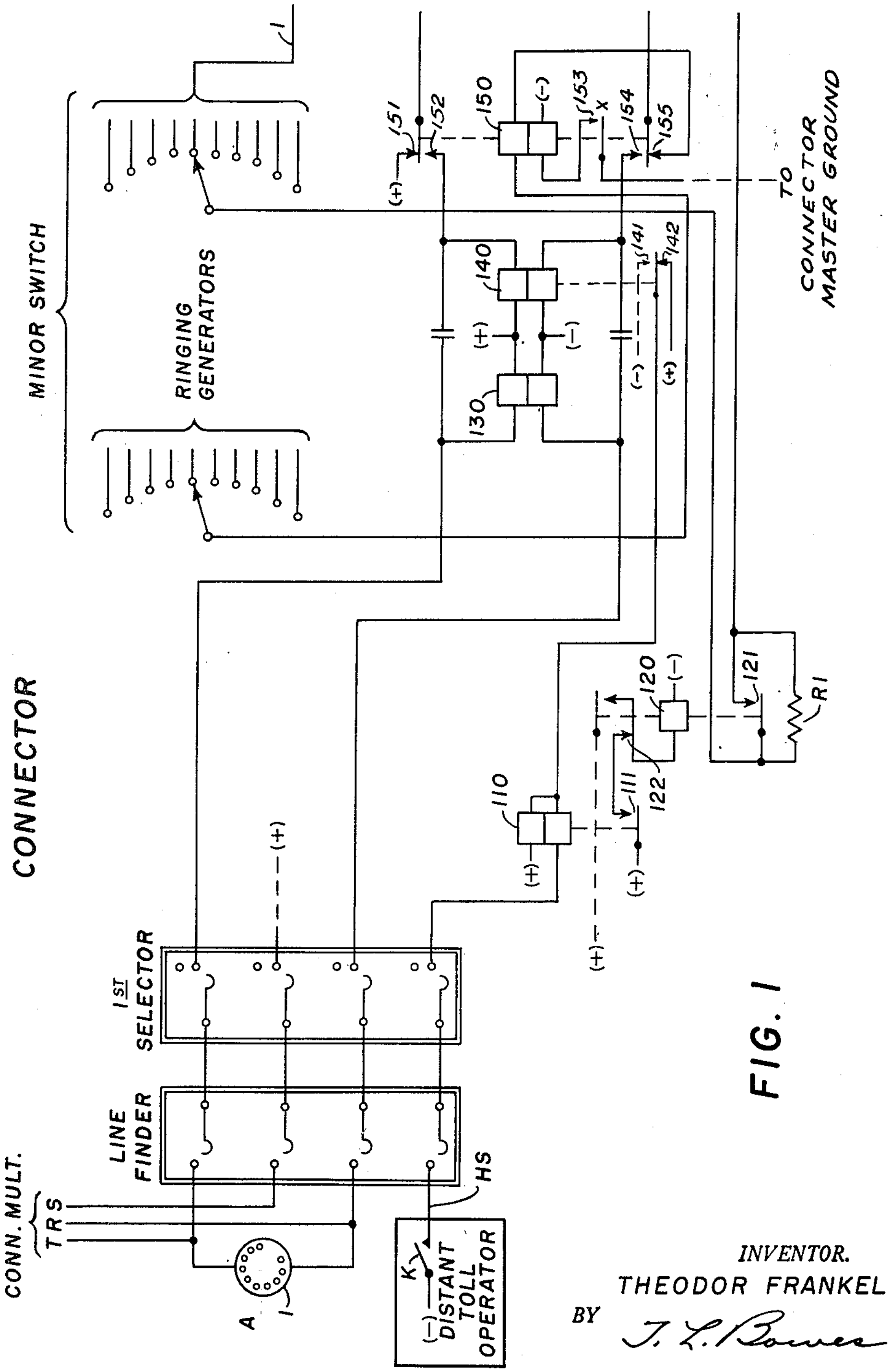

This invention relates to automatic telephone systems and more particularly to intercept means for automatic telephone systems.

Intercept circuits have been proposed heretofore in which calls to be intercepted are routed to an intercept operator by means of a plurality of intercept line circuits and an intercept trunk. For an example of a suitable circuit of this type see the co-pending application of Frank Kessler, Serial No. 37,458, filed July 7, 1948, now Patent 2,605,362, and assigned to the same assignee as the present invention.

In an automatic telephone exchange, it often is necessary to intercept calls which are directed to unused terminals of an automatic switch. These terminals may be vacant either because a subscriber has been disconnected or because portions of the switch are unused so that room may be left for expansion as the exchange grows. Usually calls to these unused terminals are extended to an operator position. The operator then either attempts to complete the call or explains to the calling subscriber why the call cannot be completed. One type of calls which may be directed to the intercept operator is a toll call which was originated by and extended from a distant exchange. In toll calls of this type, a distant operator merely dials the number of the local called subscriber after which she directs her attention to another call. Some recall means must be provided in case this toll call is intercepted, otherwise the attention of the distant operator would not again be directed to this particular call and therefore that operator would think that it was completed in the usual manner. This recall feature is commonly known as "answering supervision." Ordinary local calls may also be intercepted. These local calls conventionally are from various types of subscribers, including pay stations. The pay station telephone ordinarily collects a coin on receipt of answering supervision.

It, therefore, becomes necessary for an intercept operator to return answering supervision to the distant toll operator but not to a local subscriber. In the past, the intercept operator has first received a call, second determined the origin of the call and third operated various keys selectively to control the transmission of answering supervision differently in accordance with the nature of the calling party. This procedure is undesirable since it requires extra training for an intercept operator and since it sometimes leads to undesired collection of coins. Therefore, it is desirable to provide an automatic arrangement by which the origin of the call may be determined and by which answering supervision either will or will not be returned without requiring any extra thought process on the part of the operator.

It is, therefore, an object of this invention to provide new and improved intercept trunk means.

Another object of my present invention is to provide an intercept trunk which has means for distinguishing between local and toll calls.

Still another object of the present invention is to provide an intercept circuit capable of distinguishing between local and toll calls and to provide answering supervision only in connection with toll calls.

The foregoing objects of my invention are achieved in the preferred embodiment of my invention by making use of a toll line relay in the connector as part of monitor means for distinguishing between local and toll calls reaching an intercept trunk. In order to provide the necessary distinction between toll and local calls, I provide a series circuit including a resistor shunted by a pair of normally open relay contacts (the contacts being under the control of the toll line relay), a control conductor extending between the connector and the intercept trunk circuit and two relays in the trunk circuit. The first of the two trunk relays is chosen to be operated by current flowing in the above-mentioned series circuit including the resistor but the second trunk relay is of the marginal type and is not energized by the resistance current. On toll calls, operation of the toll line relay is employed to cause shorting of the resistor by closing the normally open contacts shunting the resistor. The resulting increase of current in the above-mentioned series circuit is of such value as to operate the second trunk relay. In order to permit the intercept operator to provide answering supervision only on toll calls, there is provided an impedance which is arranged to be connected across the extended talking conductors through normally open contacts of the second trunk relay. Hence, on local calls, the second trunk relay is not operated and the loop is not completed through the impedance because the circuit across the loop is broken at the normally open contacts associated with the second trunk relay. On toll calls, however, the normally open contacts associated with the second trunk relay are closed and thereby the loop across the extended talking conductors is closed and answering supervision may be provided by the intercept operator.

Figure 5:
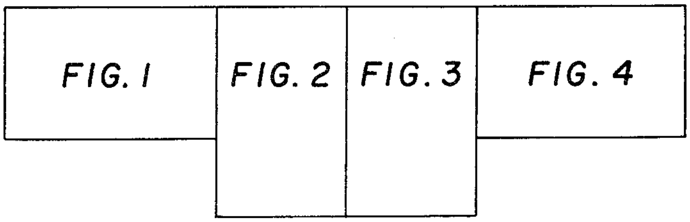

The features of my invention which I believe to be novel are set forth with particularity in the appended claims. My invention, both as to its organization and manner of operation, together with further objects and advantages thereof may best be understood by reference to the following description taken in connection with the accompanying drawings in which Figs. 1, 2, 3 and 4 when placed as shown in Fig. 5 illustrate an automatic telephone system having intercept facilities embodying the principles of my invention.

In order to simplify the illustrations and to facilitate the explanation of the operation of the circuits shown in the drawings, certain parts of the telephone system and circuits constituting the present embodiment of my invention have been shown diagrammatically and certain conventional illustrations have been employed, the drawings having been made more with the purpose of making it easy to understand the principles and mode of operation than with the idea of illustrating the specific construction and arrangement of parts that would be actually employed in practice. For example, the various relays and their contacts are illustrated in a conventional manner with all of the contacts controlled by a particular relay being associated with this relay by means of a vertical dashed line. The finder and selector switches for associating a calling line with an intercept circuit are illustrated in block form, as shown in the left hand portion of Fig. 1. Only a portion of the connector circuit is illustrated in Fig. 1. The negative side of the common exchange battery or source of potential is indicated by (−) and the positive side of the exchange battery, which is usually grounded, is indicated by (+). For convenience in illustrating and describing the features of the present invention, it is assumed that the invention is applied to a party line telephone system of the harmonic ringing type.

Referring to the drawings, there is shown in Fig. 1 a local subscriber indicated by the letter A, the local subscriber A being represented by the simulated dial 1. There is shown a plurality of leads or conductors extending between the substation A and the terminals of a line finder. These may be identified as the talking conductors T and R or in other language the tip and ring leads. There is also provided a sleeve lead S extending between the connector multiple and the line finder bank for purposes well known in the art. A control lead HS is also illustrated. The schematic representation of the line finder indicates a plurality of sets of terminals with four brushes.

It is to be understood that in a manner well understood in the art, upon the appearance of a calling condition on the line extending to substation A, the line finder is set in operation to find the calling line and thereby connect the calling line to the first selector. As is well understood in the art, the operation of dial 1 may be employed to extend the call through the automatic step switch associated with selector S in order to extend the talking conductors to the connector shown on the right hand portion of Fig. 1 in skeleton form. It may be noted that the selector comprises four sets of contacts and illustrates the provision of four brushes.

Referring to the right hand portion of Fig. 1 there is illustrated the presence of a calling bridge relay 130, answering bridge relay 140, ring trip relay 150 and cut through relay 160 (Fig. 2) which operate in conventional manner under the control of the dial 1 to extend a call from substation A to a desired called line.

Figure 2:
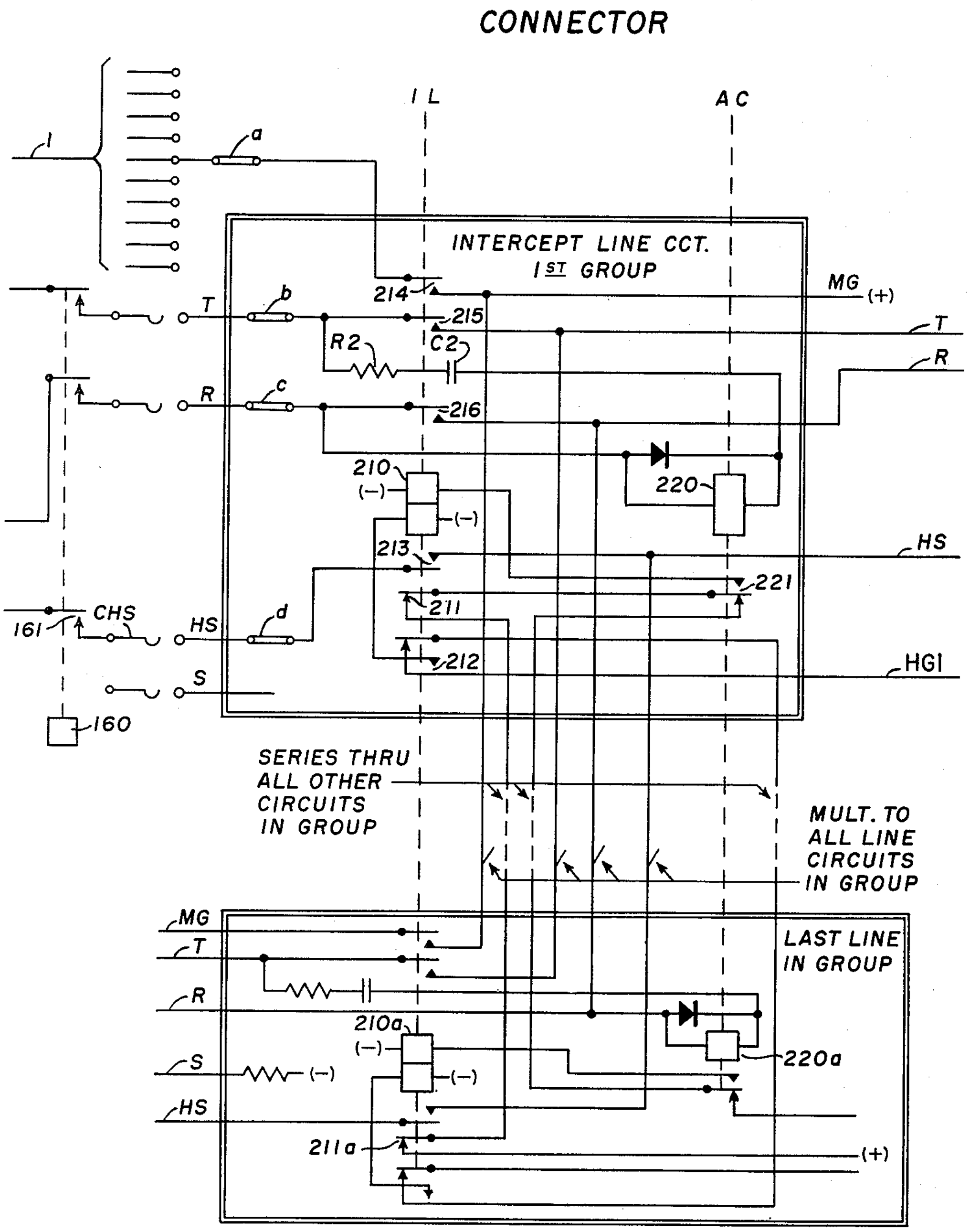

It is now assumed that the called line is on intercept either because a private line is to be intercepted or because one subscriber on a party line is to have intercept service. In Fig. 2 there is shown a plurality of intercept line circuits. The party lines are provided with a harmonic ringing system as illustrated in Fig. 1 wherein a minor switch constitutes the party selecting device. Assuming a call to a party line, the minor switch is advanced upon the dialing of a ringing digit in order to select and apply to the ring lead R the proper ringing frequency as by means of the left wiper and bank of the minor switch. When a subscriber has dialed an intercepted number he is connected to the intercept circuit shown in Fig. 2 through the cross-connections indicated by the letters *a*, *b*, *c* and *d* in Fig. 2. The ringing current is connected through the left wiper and bank of the minor switch, the upper winding of ring trip relay 150, rest contacts 155, operated contacts on relay 160, ring conductor R, strap *c*, the winding of alternating current relay 220, capacitor C2, resistor R2, strap *b*, tip conductor T, operated contacts on relay 160, to ground on contacts 151, thereby operating the relay 220. If it is assumed that the intercepted number is connected to the first line in the group of Fig. 2, the intercept line relay 210 is operated over a circuit extending from battery through the upper winding of relay 210, operated contacts 221 of relay 220, normal contacts 211 of relay 210, a chain of normal contacts of the other line relays including the last line relay 210*a* in the group to ground.

With this arrangement it is to be noted that if two intercepted numbers are dialed by different subscribers and two lines in the group are simultaneously seized, only the first line will be connected as all other lines are required to go through a chain of contacts of relays 220—220*a*.

Figure 3:
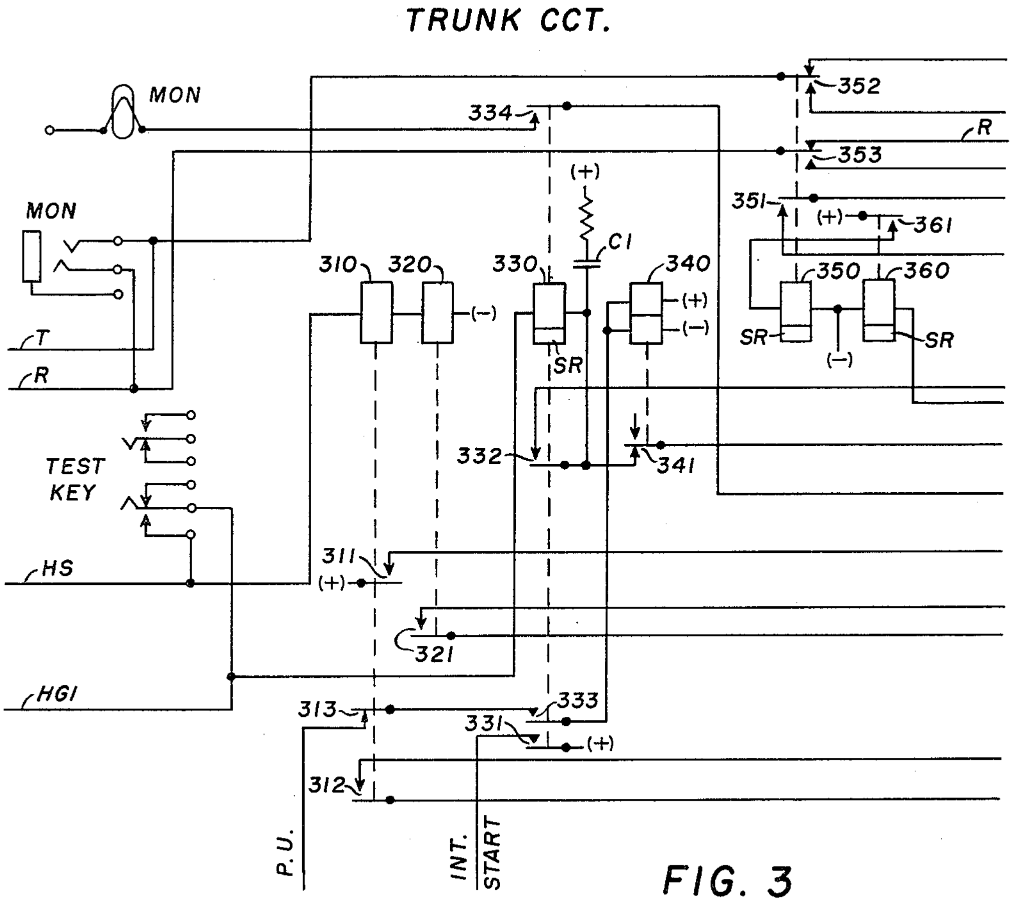

Relay 210 is held operated over a circuit extending from battery through the lower winding of relay 210, operated contacts 212 and control conductor HG-1 extending between the intercept line circuit and the trunk circuit of Fig. 3, winding of relay 330, normally closed or break contacts 341 of relay 340, and normal contacts 421 of relay 420 to ground. Upon the completion of this circuit, relay 330 operates.

Upon the operation of line intercept relay 210 a circuit is completed for the operation of relay 310 (hereinafter identified as the first trunk relay), the energizing circuit extending from ground on lead MG (upper portion of Fig. 2), make contacts 214 of relay 210, cross connector *a*, conductor 1, the right hand section of the minor switch, resistor R1, operated contacts 161 of cut through relay 160, connector brush CHS, conductor HS, cross-connector *d*, make contacts 213, control conductor HS, the winding of the first trunk relay 310, and the winding of relay 320 (hereinafter identified as the second trunk relay) to battery. As described hereinafter, the windings of relays 310 and 320 are chosen so that relay 310 operates to close its spring contacts upon the foregoing series circuit including resistor R1, but relay 320 is of the marginal type and is not operated on the amount of current flowing with resistor R1 in circuit, although upon the closure of the normally open contacts 121 shunting resistor R1, sufficient current flows in the foregoing series circuit to operate relay 320 in series with relay 310.

Figure 4:
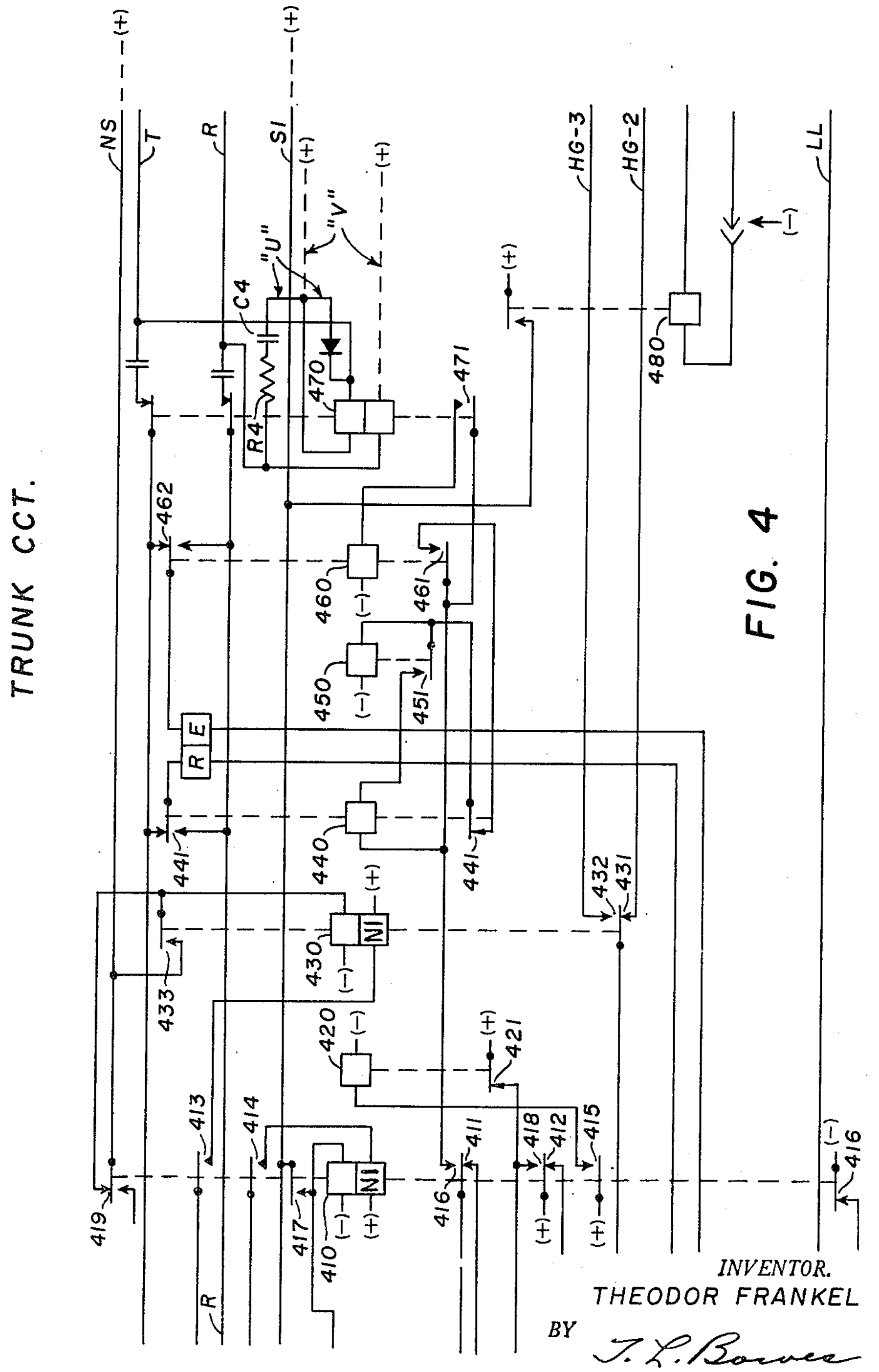

The operation of relay 310 forwards a ground from operated contacts 311 of relay 310 through normal contacts 431 of relay 430 to lead HG-2 extending to the intercept operator's position or intercept answering trunk indicated at the right hand side of Fig. 4. For a suitable intercept answering trunk see the above-identified Kessler application.

If the night service relay 430 is operated (as hereinafter explained) the foregoing ground is forwarded through operated contacts 432 to lead HG-3 to the intercept answering trunk or intercept operator's position.

Referring back to the operation of relay 330, the interrupter circuit is energized by applying ground to the interrupter start lead INT START by way of operated contacts 331. Operation of relay 330 also completes a circuit for energizing relay 360 over a circuit extending from battery through the winding of relay 360, normal contacts 411, operated contacts 332, and normal contacts 341 and 421 to ground. In response to the operation of relay 360, relay 350 operates over a circuit extending from battery through the winding of relay 350 and operated contacts 361 to ground. The operation of relay 330 also results in the lighting of monitor lamp MON over an obvious circuit including operated contacts 334 and normal contacts 412.

The succeeding circuit, in this case the intercept answering trunk under the control of the intercept operator, answers the intercepted call by placing a ground on lead S1 in a manner well known in the art.

In response to the appearance of ground on lead S1, relay 410 operates over a circuit extending from battery through the upper winding of relay 410, operated contacts 351 and conductor or lead S1 to the intercept answering trunk. Relay 410 locks through its own operated contacts 417 to ground on the S1 lead.

The tip lead T is extended through operated contacts 215, 352 and 413 to resistance ground, the lower winding of relay 430 being employed as a resistance, and the ring lead R is extended to resistance ground through operated contacts 216, 353 and 414 to resistance ground, the lower winding of relay 410 constituting the necessary resistance. Ring trip relay 150 in the connector shown in Fig. 1 operates over its upper winding and locks through its lower winding to the connector master ground via its "X" or preliminarily operated contacts 153 but answering bridge relay 140 is not operated and the alternating current relay 220 releases because of the removal of the energizing ringing frequency. Therefore, no change is made in the marking extended through contacts 142 and the lower winding of relay 110 to the lowermost brush of the first selector; hence no answer supervision is returned.

Referring again to the operation of relay 410, a circuit is provided through operated contacts 415 for operating relay 420 over an obvious circuit and the operation of relay 410 releases relays 350 and 360 by opening contacts 411.

The foregoing description relates to the extension of a call from a local calling line to an intercept answering trunk. There is now described the arrangement for extending an intercepting call from a calling toll line. A calling toll line is indicated in the left-hand portion of Fig. 1 by the legend "Distant Toll Operator." In a manner well understood in the art, the toll operator applies battery to the HS lead as by means of a suitable key K and the finder selector link operates to find the calling line and extends the calling toll line to the connector thereby energizing toll line relay 110 over the HS lead in an obvious manner. The operation of relay 110 causes energization of auxiliary toll relay 120 over a circuit including operated contacts 111 and normal contacts 122. Upon the operation of relay 120, contacts 121 are closed to short out resistor R1.

A circuit is now completed for operating relay 320 in the trunk circuit over a series circuit extending from battery at relay 320 through the windings of relays 320 and 310 in series, the HS lead, operated contacts 213, connector *d*, brush and contacts CHS, operated contacts 161 and 121, the right-hand minor switch section, jumper *a*, and operated contacts 214 to ground. Since resistor R1 is now cut out of the series circuit, relay 320 receives enough current to operate that relay. In this manner, means is provided for discriminating between local and toll calls. In other words, on local calls relay 310 operates but relay 320 does not. On the other hand, on toll calls both relays 310 and 320 operate. The resulting operation of the trunk circuit is the same as previously described up to the time that the talking conductors T and R are extended to the intercept answering trunk. On a toll call, the intercept operator can give answering supervision in the following manner. For this purpose there is provided a flashing relay 470. If the wiring indicated by the letter "U" is used, flashing by ringing on the trunk is provided. With this arrangement, the alternating current ringing current enters on tip lead T and is conducted through the upper winding of relay 470, condenser C4 and resistance R4 to the ring lead R, thereby operating relay 470. If the "V" wiring is used, means is provided for operating relay 470 by connecting battery to either tip lead T or ring lead R. If battery is applied to tip lead T, it is conducted through the upper winding of relay 470 to ground on the "V" wiring. If battery is applied to ring lead R, it is conducted through the lower winding of relay 470 to ground on the "V" wiring.

In response to the operation of relay 470, relay 460 is operated over a circuit extending from battery through the winding of relay 460, operated contacts 471, 416 and 332, and normal contacts 341 and 421 to ground. The operation of relay 460 completes a circuit for energizing relay 450, that circuit extending from battery through the winding of relay 450, normal contacts 441, operated contacts 461 of relay 460, make contacts 416 and 332 and normal contacts 341 and 421 to ground. Operation of relay 460 energizes relay 440 from battery through relay 450, operated contacts 451, winding of relay 440, operated contacts 416 and 332, normal contacts 341 and operated contacts 418 to ground. When relay 470 is released by the intercept operator, relay 460 releases because of the opening of contacts 471. Upon the release of relay 460, the energization circuit for relay 450 is opened at contacts 461 but relay 450 remains operated through contacts 451 and relay 440.

Impedance coil RE is now connected between the calling tip and ring leads T and R, respectively, the circuit extending from the R lead through operated contacts 441, left-hand winding of impedance RE, operated contacts 321, right-hand winding of impedance RE, and normal contacts 462 to tip lead T, thereby completing the loop across the tip and ring leads and resulting in the operation of the answering bridge relay 140 shown in the connector of Fig. 1 to give answering supervision by any well known means, such as by closing contacts 141 to transmit a battery marking to the lowermost wiper of the first selector, for example.

The toll operator and the intercept operator are now connected on a talking basis.

Night service may be given by placing a ground on lead NS. This ground is forwarded through normal contact 419 of relay 410 to relay 430, and relay 430 locks to ground on the NS lead through its own operated contacts 433.

If a number on a party line is dialed which has not been intercepted but another number on that same party line has been intercepted, an intercept line circuit of Fig. 2 is seized and the proper intercept relay, for example, relay 210, and alternating current responsive relay, for example, relay 220, operated. In turn the relay 330 in the trunk circuit (Fig. 3) is operated as previously described. In this case, however, relay 310 is not operated because the minor switch comes to rest on a contact which is not jumpered to ground as by means of a strap *a* and, hence, no ground is furnished to operate relays 310 and 320.

When the calling party releases, relay 310 is released if the number dialed was one number of a party line because of the return of the finder switch to its home or normal position.

It will be recalled that the operation of relay 330 started the interrupting machine by closing contact 331. A momentary ground is forwarded on the pickup lead PU by way of normal contacts 313 and operated contacts 333 to momentarily operate relay 340 which holds open the holding path of relay 330 and the intercept line relay at now open contacts 341. As a result relays 330 and 210 are released. When the succeeding circuit releases, ground is removed from lead SI which releases relay 410. In turn, relay 420 is released at now open contacts 415 and the release of relay 410 also removes the holding ground for relays 440 and 450 at now open contacts 416.

From the foregoing description it is seen that there is provided a discriminating circuit according to which first trunk relay 310 operates on both toll and local calls but second trunk relay 320 operates only on toll calls and the talking loop is extended and answering supervision is permitted by enabling the talking loop to be completed through impedance RE and contacts 321 of relay 320 only in response to the extension of toll calls to the trunk circuit.

While I have shown and described a particular embodiment of my invention, it will be obvious to those skilled in the art that changes and modifications may be made without departing from my invention in its broader aspects. I, therefore, aim in the appended claims to cover all such changes and modifications as fall within the true spirit and scope of my invention.

What is claimed is:

1. In a telephone system having a plurality of toll lines, a toll operator's position for extending calls from said toll lines, a plurality of local lines, each of said lines having a pair of talking conductors, an intercept trunk circuit, first and second trunk relays, means for operatively connecting said relays into said trunk circuit, an intercept operator's position, and means for extending the talking conductors of a calling line through said intercept trunk circuit to said intercept operator's position responsive to a call from one of said lines to an intercepted subscriber on one of said lines, means for distinguishing between local and toll calls comprising means for operating only said first trunk relay on local calls and for operating both of said trunk relays on toll calls, and means responsive only to the operation of said second trunk relay for closing a loop across the extended talking conductors, means to return answering supervision to said toll operator's position only on toll calls, and means whereby said last-named means is made effective responsive to the closing of said loop across said talking conductors.

2. In a telephone system having a plurality of toll lines, a toll operator's position for extending calls from said toll lines, a plurality of local lines, each of said lines having a pair of talking conductors, an intercept trunk circuit having first and second trunk relays, means for operatively connecting said relays into said trunk circuit, contact means operated by each of said trunk relays, an intercept operator's position, and means for extending the talking conductors of a calling line through said intercept trunk circuit to said intercept operator's position responsive to a call from one of said lines to an intercepted subscriber on one of said lines, means for distinguishing between local and toll calls comprising means for operating only said first trunk relay on local calls and for operating both of said trunk relays on toll calls, an impedance, means responsive only to the operation of said second trunk relay for closing a loop including said impedance across the extended talking conductors, means to return answering supervision to said toll operator's position only on toll calls, and means whereby said last-named means is made effective responsive to the closing of said loop across said talking conductors.

3. In a telephone system having a plurality of toll lines, a toll operator's position for extending calls from said toll lines, a plurality of local lines, each of said lines having at least a pair of talking conductors, an intercept trunk circuit, a first trunk relay having characteristics such that it operates responsive to wide margins of operating potentials, a second trunk relay having characteristics such that it operates on a narrow margin of operating potentials, first circuit means operatively connecting each of said relays into said intercept trunk circuit, an intercept operator position, means for extending the talking conductors of a calling line through said intercept trunk circuit to said intercept operator position responsive to a call from said calling line to another of said lines which is connected for intercept service, a control relay, contacts operated to either of two positions by said control relay, second circuit means operatively connecting said control relay to be controlled over said calling line, a resistor, means including said set of contacts for switching said resistor into and out of said first circuit, means for distinguishing between a first class of calls over said local lines and a second class of calls over said toll lines comprising means for selectively operating said control relay only on calls of one of said classes, said wide margin trunk relay operating when said control relay contacts are in both of its said positions, said narrow margin trunk relay operating only when said control relay contacts are in one of its said positions, means responsive to the operation of one of said trunk relays for completing a loop across said talking conductors, means to return answering supervision to said toll operator's position, and means for rendering said last-named means effective responsive to the completion of said loop; whereby, answer supervision is returned only when one of said trunk relays operates.

4. In a telephone system having a plurality of toll lines, a toll operator's position for extending calls from said toll lines, a plurality of local lines, each of said lines having a pair of talking conductors, automatic switches for extending calls from either said toll lines or said local lines, station selecting means, a first control conductor between said toll operator's position and said automatic switches, means including a control relay having a pair of normally opened contacts and operative only upon the presence of a control potential on said first control conductor and thereby being responsive only to toll calls for closing said contacts, a resistor connected across said contacts, an intercept line circuit, connected to said automatic switches, a second control lead extending between said automatic switches and said intercept line circuit, an intercept trunk circuit having first and second trunk relays, said first trunk relay having characteristics such that it operates on a first margin of operate potentials and the second of said relays having characteristics such that it operates on a different margin of operate potentials, contact means controlled by each of said trunk relays, an intercept operator's position, a source of potential, and means for extending the talking conductors of a calling line through said automatic switches, said intercept line circuit, and said intercept trunk to said intercept operator's position in response to a call from one of said lines to an intercepted subscriber on one of said lines; the combination therewith of means for distinguishing between local and toll calls comprising a series circuit including said station selecting means, said relay contacts, said second control lead, windings on both of said trunk relays and said source of potential; means for closing a loop across the extended talking conductors, said loop comprising an impedance, a series circuit across said talking conductors comprising a pair of normally opened contacts of said second trunk relay and said impedance; means to return answer supervision to said toll operator only on toll calls, means for rendering said last-named means effective only responsive to the closing of said loop, said margin of said first trunk relay being constructed to operate in response to a call from any of said lines, said margin of said second trunk relay being constructed to operate only when said control relay is operated to shunt out the resistor in said series circuit whereby said second trunk relay is operative only on toll calls but is not operative on local calls whereby said loop completing circuit is completed only on toll calls in order to give answering supervision to the calling toll operator.

References Cited in the file of this patent

UNITED STATES PATENTS

| Number | Name | Date |
|---|---|---|
| 1,930,612 | Getz | Oct. 17, 1933 |
| 1,950,129 | Whitney | Mar. 6, 1934 |
| 2,021,286 | Butz | Nov. 19, 1935 |
| 2,105,898 | Whitney | Jan. 18, 1938 |
| 2,344,634 | Powell | Mar. 21, 1944 |